US008301491B2

(12) United States Patent
Bapna et al.

(10) Patent No.: US 8,301,491 B2
(45) Date of Patent: Oct. 30, 2012

(54) ITEM RESERVATION

(75) Inventors: Abhishek Bapna, Palo Alto, CA (US); Jon Feldman, New York, NY (US); Shanmugavelayutham Muthukrishnan, New York, NY (US)

(73) Assignee: Google Inc., Mountain View, CA (US)

( * ) Notice: Subject to any disclaimer, the term of this patent is extended or adjusted under 35 U.S.C. 154(b) by 538 days.

(21) Appl. No.: 12/144,497

(22) Filed: Jun. 23, 2008

(65) Prior Publication Data
US 2009/0319389 A1 Dec. 24, 2009

(51) Int. Cl.
*G06Q 40/00* (2012.01)
(52) U.S. Cl. .......................................................... 705/14
(58) Field of Classification Search .............. 705/35–38, 705/14
See application file for complete search history.

(56) References Cited

U.S. PATENT DOCUMENTS

| | | | | |
|---|---|---|---|---|
| 6,021,397 | A * | 2/2000 | Jones et al. .................. | 705/36 R |
| 2001/0042785 | A1* | 11/2001 | Walker et al. .................. | 235/379 |
| 2003/0083926 | A1* | 5/2003 | Semret et al. ..................... | 705/10 |
| 2004/0117302 | A1* | 6/2004 | Weichert et al. ................ | 705/40 |
| 2004/0220821 | A1 | 11/2004 | Ericsson et al. | |
| 2006/0224496 | A1* | 10/2006 | Sandholm et al. .............. | 705/37 |
| 2006/0271429 | A1 | 11/2006 | Borgs et al. | |
| 2008/0004962 | A1 | 1/2008 | Muthukrishnan et al. | |
| 2008/0103895 | A1 | 5/2008 | Burdick et al. | |
| 2008/0109343 | A1* | 5/2008 | Robinson et al. ............... | 705/37 |
| 2009/0132402 | A1* | 5/2009 | Youngren et al. ............... | 705/35 |

OTHER PUBLICATIONS

Huhns et al.: Online Auctions, May-Jun. 1999, IEEE Internet Computing, pp. 2-4.*
Damgaard, A: Computations of Reservation Prices of Options with Proportional Transaction Costs, 2006, Journal of Economic Dynamics & Control, 30, pp. 415-444.*
Borle et al.: The Timing of Bid Placement and Extent of Multiple Bidding: An Emirical Investigation Using e-Bay Online Auctions, 2006, Statistical Science, vol. 21, No. 2, pp. 194-205.*
Gorton et al.: Facts and Fantasies about Commodity Futures, 2005, The Rodney L. White Center for Financial Research, The Wharton School, University of Pennsylvania, pp. 1-42.*
PCT International Search Report and the Written Opinion, PCT/US2009/048154, Feb. 12, 2010, 11 pages.
PCT International Preliminary Report on Patentability, PCT/US2009/048154, Jan. 5, 2011, 6 pages.

\* cited by examiner

*Primary Examiner* — Bijendra K Shrestha
(74) *Attorney, Agent, or Firm* — Fish & Richardson P.C.

(57) ABSTRACT

Items can be reserved in advance of a future spot market sale. A reservation price can be determined for the item based on an expected spot market price required to obtain the item in the future sport market sale, a time until the spot market sale, and/or market signals. The reservation price can converge to the expected spot market price as the time of the future spot market approaches.

15 Claims, 6 Drawing Sheets

ITEM RESERVATION

BACKGROUND

This document relates to content presentation.

The rise of the Internet has enabled access to a wide variety of content items, e.g., video and/or audio files, web pages for particular subjects, news articles, etc. Such access to these content items has likewise enabled opportunities for targeted advertising. For example, content items of particular interest to a user can be identified by a search engine in response to a user query. The query can include one or more search terms, and the search engine can identify and, optionally, rank the content items based on the search terms in the query and present the content items to the user (e.g., according to the rank). This query can also be an indicator of the type of information of interest to the user. By comparing the user query to a list of keywords specified by an advertiser, it is possible to provide targeted advertisements to the user.

Another form of online advertising is advertisement syndication, which allows advertisers to extend their marketing reach by distributing advertisements to additional partners for presentation in available placements. In an online environment, placements are subsets of a content network. For example, a placement can be any web property, e.g., a website, a domain, or subset of web pages, etc., where an advertiser can place content items (e.g., advertisements). In other implementations for other media, a placement can be a media property that can be used to publish a content item, such as an advertisement.

Through syndication, third party (e.g., online) publishers can place an advertiser's text, audio or image advertisements in placements (e.g., advertisement slots) on web pages that have content related to the advertisement. As the users are likely interested in the particular content on the publisher webpage, they are also likely to be interested in the product or service featured in the advertisement. Accordingly, such targeted placement can help drive online customers to the advertiser's website.

To place advertisements either through a search engine or through advertising syndication, an advertiser can participate in a spot market auction. In the spot market auction, placements for the advertisements are auctioned at the time of serving. In these situations, advertisers submit bids and await the outcome of the auction to learn whether their advertisement is served in the placement. The spot market auctions, however, do not facilitate purchasing of placements in advance of their availability.

SUMMARY

The subject matter of this specification relates to content presentation and in particular to item reservation, e.g., reserving placements in advance of a future spot market auction. The reservation pricing can be determined for the reserved item based on an expected future spot market price, the time left before the spot market auction, and/or a time value factor.

The time value factor can be based on the value that advertisers place on reserving the item now, rather than waiting to buy the item in the spot market. The advertiser's current value for the item can be determined based on the value associated with an assurance that an advertiser will not lose the item in the spot market; that an advertiser can protect against price increases in the spot market; and increased availability of advertiser resources that would otherwise be used to participate in and monitor the spot market auction. The time value factor can vary over time, based on the item being reserved, and market factors (e.g., particularly valuable advertising time periods, such as the week before Christmas).

In some implementations, the reservation system can include a feedback module that can facilitate adjustment of the reservation price based on, for example, the time and time value factors. As the spot market time approaches, the feedback module implements a decay factor so that in the absence of market signals, the price paid by the advertiser will decay to the spot market price. When market signals are detected by the feedback module, the price of the reservation can increase. The disclosed reservation system can be implemented in various types of auctions, and can also be implemented across multiple item categories.

In general, one aspect of the subject matter described in this specification can be embodied in a method of determining reservation pricing. The method of determining reservation pricing can include the actions of determining a future spot price for an item, where the future spot price is an estimated price that is required for settlement in a spot market at a future time; determining a time value factor that defines a time dependent value of acquiring the item prior to the item being offered in the spot market at the future time; and determining a reservation price for a current time for the item based on the future spot price and the time value factor, where the reservation price converges to the future spot price as the current time approaches the future time. Other embodiments of this aspect include corresponding systems, apparatus, and computer program products.

These and other implementations can optionally include one or more of the following features. The reservation price can be adjusted based on market signals. The market signals can be time-based signals that cause the reservation price to decrease. The market signals can also be demand signals that cause the reservation price to increase or decrease. The future spot market price can be determined based on previous actual spot market prices for the item. The spot market can be an online auction, and the item can be an online advertisement placement.

Particular embodiments of the subject matter described in this specification can be implemented so as to realize one or more of the following advantages. Buyers that cannot bear the risk of losing the item in the spot market can acquire the item at a current time rather than awaiting the spot market auction at the future time. An owner of an item that will be available in the spot market at a future time can reduce a risk of not receiving an expected spot market price. Buyers that do not reserve items can reallocate resources to participate in spot markets for items that have not been reserved. Items can be efficiently allocated among buyers based on the value of the items to the buyers. A current reservation price for an item can reflect the future spot market price and the increased value for the reservation in advance of the future spot market time.

These various optional advantages and features can be separately realized and need not present in any particular embodiment. The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
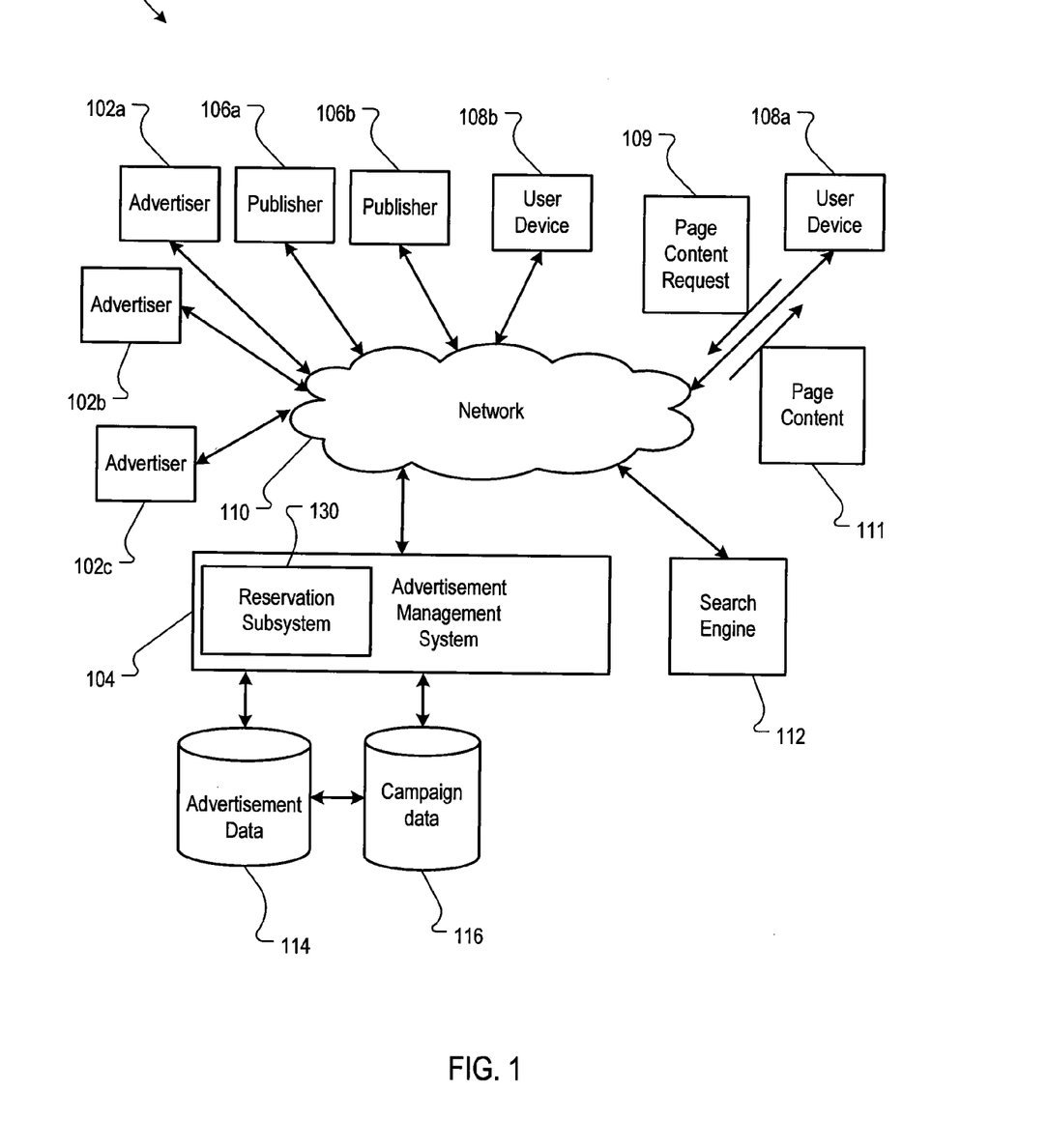
FIG. 1 is a block diagram of an example online environment in which reservation pricing can be implemented.

FIG. 1 is a block diagram of an example online environment 100 in which reservation pricing can be implemented. The online environment 100 can facilitate the identification and serving of content items, e.g., web pages, advertisements, etc., to users. A computer network 110, such as a local area network (LAN), wide area network (WAN), the Internet, or a combination thereof, connects advertisers 102a and 102b, an advertisement management system 104, publishers 106a and 106b, user devices 108a and 108b, and a search engine 112. Although only three advertisers (102a, 102b, and 102c), two publishers (106a and 106b) and two user devices (108a and 108b) are shown, the online environment 100 may include many thousands of advertisers, publishers and user devices.

Throughout this document, reservation pricing is described with relation to online advertising. However, reservation pricing can be implemented for any content. For example, the reservation system disclosed can be used to reserve and price print media advertisement inventory, goods being auctioned in a single spot market auction or over a time period, commodities, etc.

§1.0 Advertisement Publishing and Tracking

In some implementations, one or more advertisers 102a, 102b and/or 102c can directly, or indirectly, enter, maintain, and track advertisement information in the advertising management system 104. The advertisements can be in the form of graphical advertisements, such as banner advertisements, text only advertisements, image advertisements, audio advertisements, video advertisements, advertisements combining one of more of any of such components, etc., or any other type of electronic advertisement document. The advertisements may also include embedded information, such as links, meta-information, and/or machine executable instructions, such as HTML or JavaScript™.

A user device, such as user device 108a, can submit a page content request 109 to a publisher or the search engine 112. In some implementations, the page content 111 can be provided to the user device 108a in response to the request 109. The page content can include advertisements provided by the advertisement management system 104, or can include executable instructions, e.g., JavaScript™, that can be executed at the user device 108a to request advertisements from the advertisement management system 104. Example user devices 108 include personal computers, mobile communication devices, television set-top boxes, etc.

Advertisement requests can also be received from the publishers 106. For example, one or more publishers 106a and/or 106b can submit advertisement requests for one or more advertisements to the system 104. The system 104 responds by sending the advertisements to the requesting publisher 106a or 106b for presentation on one or more of the publisher's web properties (e.g., websites and other network-distributed content). The advertisements can include embedding links landing pages, e.g., pages on the advertisers' 102 websites, that a user is directed to when the user clicks an ad presented on a publisher website. The advertisement requests can also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, a publisher 106 can combine the requested content with one or more of the advertisements provided by the system 104. This combined requested content and advertisements can be sent to the user device 108 that requested the content (e.g., user device 108a) as page content 111 for presentation in a viewer (e.g., a browser or other content display system). The publisher 106 can transmit information about the advertisements back to the advertisement management system 104, including information describing how, when, and/or where the advertisements are to be rendered (e.g., in HTML or JavaScript™).

Publishers 106a and 106b can include general content servers that receive requests for content (e.g., articles, discussion threads, music, video, graphics, search results, web page listings, information feeds, etc.), and retrieve the requested content in response to the request. For example, content servers, related news content providers, retailers, independent blogs, social network sites, or any other entity that provides content over the network 110 can be a publisher.

Advertisements can also be provided through the use of the search engine 112. The search engine 112 can receive queries for search results. In response, the search engine 112 can retrieve relevant search results from an index of documents (e.g., from an index of web pages). Search results can include, for example, lists of web page titles, snippets of text extracted from those web pages, and hypertext links to those web pages, and may be grouped into a predetermined number (e.g., ten) of search results.

The search engine 112 can also submit a request for advertisements to the system 104. The request may include a number of advertisements desired. This number may depend on the search results, the amount of screen or page space occupied by the search results, the size and shape of the advertisements, etc. The request for advertisements may also include the query (as entered or parsed), information based on the query (such as geo-location information, whether the query came from an affiliate and an identifier of such an affiliate), and/or information associated with, or based on, the search results.

The search engine 112 can combine the search results with one or more of the advertisements provided by the system 104. This combined information can then be forwarded to the user device 108 that requested the content as the page content 111. The search results can be maintained as distinct from the advertisements, so as not to confuse the user between paid advertisements and presumably neutral search results.

The advertisers 102, user devices 108, and/or the search engine 112 can also provide usage information to the advertisement management system 104. This usage information can include measured or observed user behavior related to advertisements that have been served, such as, for example, whether or not a conversion or a selection related to an advertisement has occurred. The system 104 performs financial transactions, such as crediting the publishers 106 and charging the advertisers 102 based on the usage information. Such usage information can also be processed to measure performance metrics, such as a click-through-rate ("CTR"), conversion rate, etc.

A click-through can occur, for example, when a user of a user device, selects or "clicks" on a link to a content item returned by the publisher or the advertising management system. The CTR is a performance metric that is obtained by dividing the number of users that clicked on the content item, e.g., a link to a landing page, an advertisement, or a search result, by the number of times the content item was delivered. For example, if a link to a content item is delivered 100 times, and three persons click on the content item, then the CTR for that content item is 3%. Other usage information and/or performance metrics can also be used.

A "conversion" occurs when a user consummates a transaction related to a previously served advertisement. What constitutes a conversion may vary from case to case and can be determined in a variety of ways. For example, a conversion may occur when a user clicks on an advertisement, is referred to the advertiser's web page, and consummates a purchase there before leaving that web page. A conversion can also be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Other actions that constitute a conversion can also be used.

§2.0 Placement Reservation

In addition to an advertiser's advertisements being selected based on content such as a search query or web page content of a publisher, the advertiser can reserve a placement (e.g., advertisement slot) on a publisher's property to present its advertisement for a defined period. The defined period can be, for example a defined time period, a defined number of impressions, a defined number of conversions, or any other definable period. During the defined period the advertiser's advertisements can be presented in the reserved placement position when the web property is served.

Placement reservation can enable advertisers to reserve placements prior to serving time. The ability to reserve placements enables advertisers to hedge risks associated with participating in spot auction for the placement at the time of serving. For example, if an advertiser is required to participate in a spot auction for the placement, the advertiser is not assured to have its advertisement served because the advertiser may not submit a bid high enough to secure the placement. In turn, the advertiser may miss an advertising opportunity if the advertiser is outbid.

Additionally, placement reservation allows advertisers to buy advertising at times when an advertising budget is available even if this does not coincide with the serving of the advertisement. For example, an advertiser may have a present budget available for a future advertising campaign, e.g., an advertising campaign that will be presented six months after the budget needs to be spent. In this scenario, the advertiser may not be able to ensure that the budget will still be available when the advertisement is actually presented. Thus, advertisers may not be able to advertise in mediums that have placements that are sold in a spot market auction (e.g., the placement is sold at the time of advertisement presentation). Accordingly, it can be advantageous to enable advertisers to reserve placements in advance of the serving time, rather than waiting for a spot market auction of the placement.

To efficiently allocate the placements, a reservation subsystem 130 can be included in the advertisement management system 104. The reservation subsystem 130 can determine an appropriate price for the reservation, as discussed below.

§3.0 Reservation Pricing

In some implementations, placements can be reserved in advance of an auction spot market performed at serving time. For example, as discussed above, advertisers 102 may be permitted to reserve placements so that the advertisers 102 can be assured that their advertisements are being served in the reserved placements at the reserved times or durations. In some implementations, the price of the placement reservations can be determined by the reservation subsystem 130. The reservation subsystem 130 can determine the appropriate price for the placement reservation, for example, by determining the value received from reserving the placement in advance of an auction. In some implementations, the value of the reservation can be determined based on the expected price for the placement if the placement is auctioned in a spot market at the time of serving, a time value factor, and/or market factors.

§3.1 Time Value Factor

In some implementations, the reservation pricing subsystem 130 can determine an expected future price for the placement if the placement is auctioned in a spot market at the time of serving. For example, the reservation pricing subsystem 130 can identify historical prices that have been paid for the placement to determine the expected price for the placement in a future auction. In some implementations, the expected price can be an average of the historical prices that have been paid for the placement. In other implementations, the expected price can be a weighted average of the historical prices, or some other central tendency of the historical prices.

In these implementations, the price paid in each previous auction can be weighted based on an auction characteristic. The auction characteristic can be, for example, a characteristic of the auction that has been identified as influencing a final auction price. The number of bids received during an auction is one example of an auction characteristic that can influence the final auction price. If more bids than average were received for a particular auction, this can be an indication that there was higher demand for the placement in that auction. In turn, the higher demand can result in a higher than average final auction price.

Day and time of advertisement serving are additional auction characteristics that can influence the final auction price for a placement, and therefore, can be considered in determining the expected future price to be paid in an auction. For example, auctions for advertisements that are served in placements the week of Thanksgiving can have a higher final auction price than placements that are served the first week of March because of an increased demand for advertising due to the holiday shopping season. Accordingly, historical auction prices that correspond to the same time period as the reservation can be weighted more heavily than historical auction prices that do not correspond to the same time period as the reservation to account for seasonal differences in placement pricing.

Once the reservation pricing subsystem 130 has determined the expected price for the placement in a future auction, the reservation subsystem 130 can use this expected price to determine the value of a reservation for the placement relative to the expected auction price. In some implementations, the reservation subsystem 130 can determine the value of the reservation based on a time value factor. The time value factor can be, for example, a representation of the value difference associated with the placement at the time of a future auction and the current time. An example equation that represents the reservation price as a function of time is provided in Equation 1.

$$P(i,t) = B(i) * f(T-t) \quad (1)$$

Where:

P(i,t,) is the reservation price for placement i at time t;

B(i) is the expected future auction price of placement i at time T; and f(T−t) is a time value factor that can vary as a function of the auction time T and the current time t.

The time value factor can increase the reservation price over the expected price when a current placement reservation is more valuable than the expected auction price. This can occur, for example, when advertisers value the assurance of securing the placement in advance, locking in a price to protect against increases in market pricing, and/or freeing up resources that might otherwise be allocated to monitoring future spot auctions.

Similarly, the time value factor can decrease the reservation price below the expected auction price when the current placement reservation is less valuable than the expected auction price. This can occur, for example, when there is risk involved with committing to purchase the placement in advance of the serving time (e.g., falling spot market prices, value is contingent on the occurring of an event, etc.). For example, if the value of a particular placement is dependent on the happening of an event, such as a particular sports team winning a scheduled sporting event, then the current reservation price may be lower than the spot market price for the placement after the happening of the event.

Figure 2A:
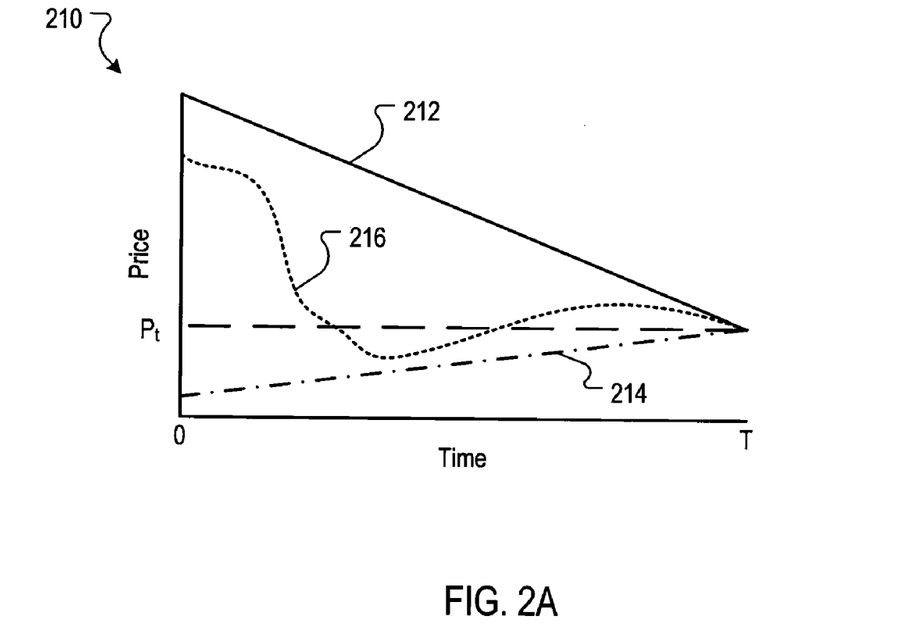
FIG. 2A is a graph of an example reservation price that varies as a function of time.

FIG. 2A is a graph of an example reservation price that varies as a function of time. The expected future auction price for the placement at time T is represented by $P_t$. The current reservation price for the placement is represented by $P_0$. As can be seen in FIG. 2A, the current reservation price for the placement decays as a function of time and converges with the expected future auction price at time T. The decay of the reservation price over time can be dependent on the time value factor that is applied to the expected future auction price $P_t$.

In this example, the time value factor decreases as the future auction time approaches. The resulting price value function represents a scenario where advertisers derive greater value from reserving the placement earlier, and therefore, the time value factor is directly proportionate to the amount of time remaining until the auction. Accordingly, as the auction time approaches, the value that the advertisers associate with the reservation decreases relative to the spot market price, until the value of reserving the placement equals the expected auction price at the time of the auction.

As shown in FIG. 2A, curve 212 is an example of a time value factor that is linear with respect to time. When the relationship illustrated by curve 212 demonstrates a situation where the value associated with a placement reservation decreases at a substantially constant rate as the time of the auction approaches.

Curve 214 is another example of a time value factor that is linear with respect to time. However, the relationship illustrated by curve 214 demonstrates a situation where the value associated with a placement reservation increases as a substantially constant rate as the time of the auction approaches.

In some implementations, the reservation subsystem 130 can determine a function that characterizes the time value factor as a function of time. In turn, the reservation pricing subsystem 130 can determine a reservation price for the placement at any time prior to the scheduled time of the future auction based on the time remaining until the auction and the expected future auction price. For example, Equation 2 is a sample time value function that can be used to determine the time value factor at any time t.

$$F(T-t) = \exp(\beta(T-t)) \quad (2)$$

Where:

β is a time sensitivity factor for the market.

According to Equation 2, when β is greater than 1, advertisers will pay more than the expected future auction price for the reservation, as indicated by the solid decay line. The higher β, the more advertisers are willing to pay for a reservation at a time in advance of the auction time. If β=1/100 then Equation 2 becomes f(t−T)=1.01^(T−t). Therefore, every day in advance of the auction, an advertiser is willing to pay an additional 1% to secure the placement. As β increases, the additional price per day over the expected future auction price increases.

In contrast, when β is negative, advertisers will pay a reduced price from the expected future auction price to reserve the placement in advance of the auction, as indicated by the linearly increasing line of the first dashed pattern. For example, if β is −1/100 then Equation 2 becomes f(t−T)=0.99^(T−t). Therefore, advertisers will pay 1% less than the expected future auction price for everyday in advance of the auction that the placement is reserved. As the magnitude of β increases, the reduction in price per day increases, such that advertisers will pay even less for reservations with a large negative β than a small negative β or a positive β.

Additional time value curves can be used to estimate the reservation price for the placement, and these value curves need not be linear and may either increase or decrease at various times. The time value curve 216 illustrates one possible example.

§3.2 Market Signals

In some implementations, the reservation price for a placement can be a function of market signals. An example market signal is a demand signal. The demand signal can, for example, represent a market demand for the placement or related placements at, or over, a defined time period. Related placements can be placements that share attributes with the placement for which a reservation price is being determined. Placements can be related, for example, by having common content, having common pages that link to the web pages containing the placements, and/or having demographic identifiers that indicate that the placements are viewed by users of a common demographic.

Figure 2B:
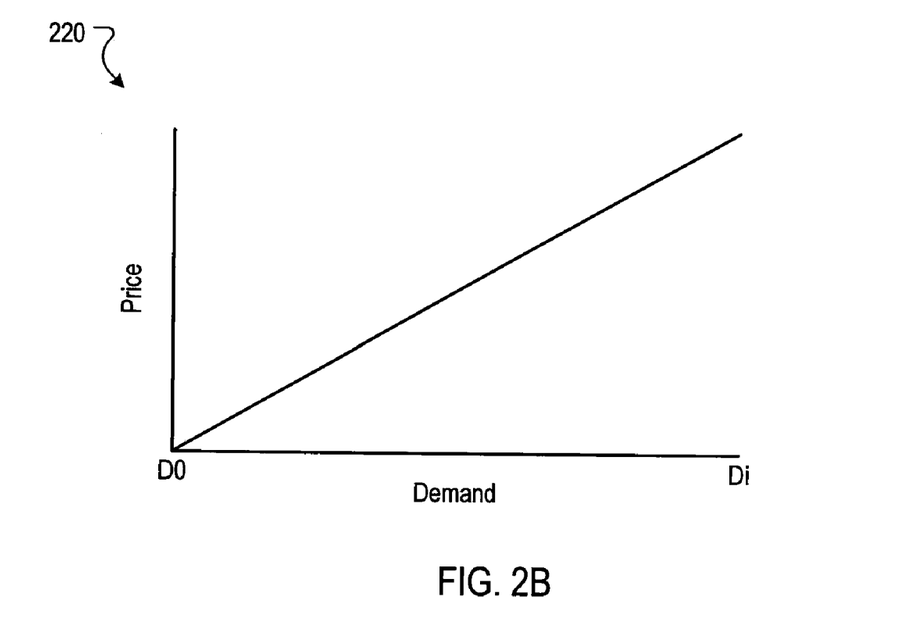
FIG. 2B is a graph of an example reservation price that varies as a function of demand.

FIG. 2B is a graph of an example reservation price that varies as a function of demand. As illustrated in FIG. 2B, the reservation price for a placement can increase as demand for the placement or related placements increases. In some implementations, the demand for a placement can be determined, for example, based on the remaining supply of related placements. For example, if a demand signal received by the reservation subsystem 130 indicates a decrease in the number of related placements that are available in the market at a time t (e.g., related placements have been reserved for serving time T), the reservation subsystem 130 can increase the current reservation price for the placement at time T. This increase in reservation price represents the increased value of the placement at time T due to the reduction in supply of related placements. The value of the placement at time T increases because advertisers that want to place an advertisement in the placement or a related placement at time T have fewer placements from which to choose. Thus, the reservation price of the remaining placements increases in proportion to the decrease in supply.

Similarly, an increase in demand for a placement or related placements can be identified, for example, based on an increase in the number of advertisers that are bidding in current auctions. An increase in the number of advertisers bidding on the placement or related placements in current auctions can result in higher auction prices. These increased auction prices may not be fully accounted for in the expected future auction price, for example, because the increased auction prices may be so recent that they are statistically outweighed by the historical data (e.g., lower prices) used to determine the future expected auction price. Therefore, an observed increase in the number of bids for a placement or related placements can increase the value of reserving the placement prior to the auction time. Accordingly, an increase in the number of advertisers that are bidding on the placement or related placements can result in a demand signal that, in turn, increases the reservation price for the placement at time T.

§3.3 Reservation Price Based on Time Value Factors and Market Signals

Figure 2C:
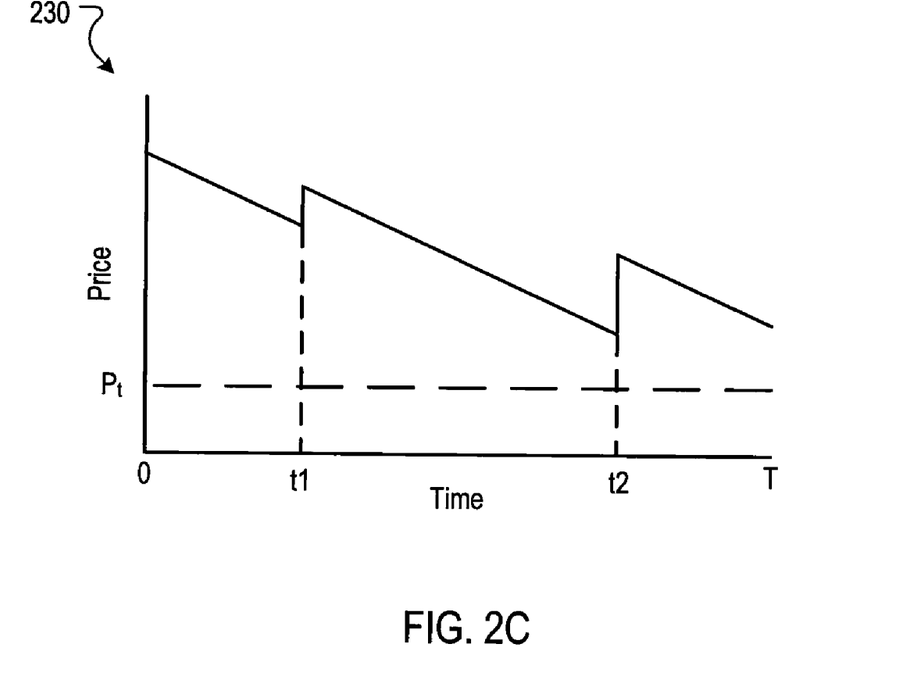
FIG. 2C is a graph of an example reservation price as a function of time with market signal adjustments.

As discussed above, the reservation price can be adjusted over time according to time value factors that correspond to each time t prior to the auction time T. In some implementations, the reservation price can be further adjusted based on market signals that are received prior to the auction time T. FIG. 2C is a graph of an example reservation price as a function of time with market signal adjustments. As can be seen in FIG. 2C, the reservation price can decay over time based on the time factors associated with each time t, similar to the graph of FIG. 2A. However, the price can also be adjusted based on received market signals that indicate an increase in demand for related placements or a decrease in supply of related placements.

For example, if a demand signal is received at time t1 indicating that a portion of the related placements have been reserved for time T, then a step increase in reservation price can occur. After the step increase at time t1, the price can continue its decay toward the expected future auction price over time. Similarly, if an additional demand signal is received at time t2 indicating that an additional portion of the related placements have been reserved for time T, then an additional step increase in the reservation price can occur that reflects the increased value of the placement due to the market signals received.

In addition to demand signals, additional market signals can be used to adjust the reservation price of a placement at time T. For example, if it is determined that monetary exchange rates affect the auction price for placements, then the reservation price can be adjusted to account for changes in monetary exchange rates. Similarly, if world events (e.g., economic events, natural disasters, political events, etc.) affect the placement market, then the reservation prices can be adjusted to account for these world events. While the market signals are described as discrete signals at particular points in time for purposes of illustration, the market signals can be adjusted on a continuous basis so that reservation prices always reflect the current market signals.

The market signals can be determined based on a sample of the placements in the market. For example, if an advertisement management system 104 manages advertisements for a network of publishers 106, then the advertisement management system 104 can identify the available inventory and bidding activities for the placements that are available within the network of publishers. Accordingly, the advertisement management system 104 can determine market signals for a market defined by the placements, or a subset of placements, that are available within the network of publishers 106.

Figure 2D:
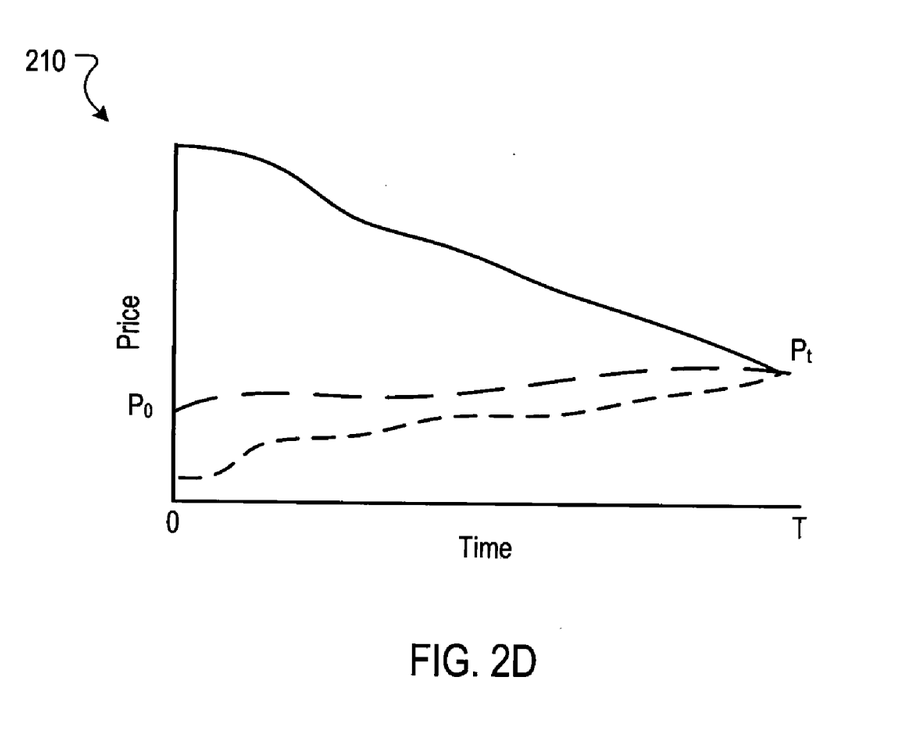
FIG. 2D is a graph of an example reservation price that varies as a function of demand and in which the future auction price varies

Additionally, while the future auction price for the placement at time T, represented by $P_f$, has been illustrated as being constant, this value may also vary over time. FIG. 2D is a graph 240 of an example reservation price that varies as a function of demand and in which the future auction price varies. Example value curves that converge to the future auction price are also shown.

§4.0 Example Reservation Subsystem

Figure 3:
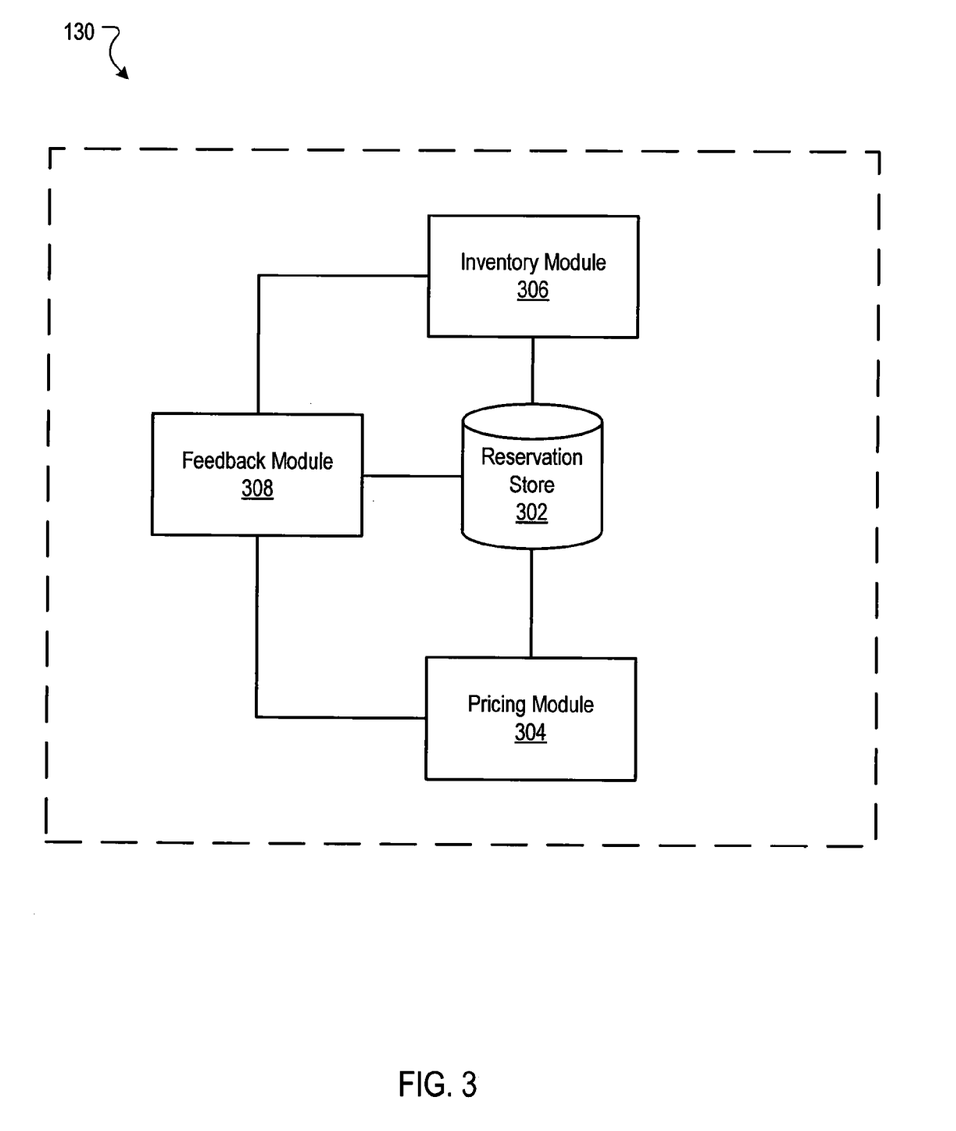
FIG. 3 is a block diagram of an example reservation subsystem.

FIG. 3 is a block diagram of an example reservation subsystem 130. In some implementations, the reservation subsystem can include a reservation store 302, a pricing module 304, an inventory module 306, and a feedback module 308. The reservation subsystem 130 can be implemented, for example, to facilitate reservation of an item prior to a spot market auction for the item.

In some implementations, the reservation store 302 is operable to receive information that can be used by the reservation subsystem 130 to create a reservation for an item. For example, the reservation store 302 can receive auction information and reservation information for placements. The auction information can include information related to past auctions for placements. For example, a final auction price, number of bidders, serving date, and serving time can be associated with each placement auction and stored in the reservation store 302. Additional placement auction information can also be stored in the reservation store 302.

In some implementations, the reservation store 302 can also store information for placement reservations. The placement reservation information can include, for example, the reservation price for the placement, the time and date of the reservation, a number of bids received for the reservation, bid values for the bids received, scheduled auction and serving times for the placement, as well as other information related to the reservation. The reservation store 302 can receive auction and reservation information for placements from the advertisement management system 104, the pricing module 304, the inventory module 306, and the feedback module 308. Similarly, the information stored in the reservation store 302 can be accessible by the advertisement management system 104, the pricing module 304, inventory module 306, and feedback module 308 to facilitate placement reservation pricing.

The pricing module 304 can be operable to determine a reservation price for a placement. In some implementations, the reservation price can be determined based on an expected future price for the placement in a spot market at a future time. An online placement auction is an example of a spot market because the auction can occur contemporaneously.

In some implementations, the pricing module 304 can determine the expected future price for a placement based on previous auction prices and reservation prices for the placement. For example, the pricing module 304 can determine an average final auction price for the placement in all of the previous auctions in which the placement has been auctioned. In turn, the pricing module 304 can assign the average price as the expected future price for the placement.

Based on the expected future price, the pricing module 304 can determine a current reservation price by adjusting the expected future price based on the time value factor associated with the placement. As discussed in reference to FIG. 2A, the time value factor represents an increase or decrease over the expected future price that an advertiser will pay to reserve the placement prior to the time of the auction. In some implementations, the feedback module 308 can provide the time value factor that corresponds to the present time to the pricing module 304. In turn, the pricing module 304 can apply the time value factor to the expected future price to determine a current reservation price. The pricing module 304 can store the current reservation price in the reservation store 302.

In some implementations, the pricing module 304 can also determine a current reservation price by adjusting the expected future price based on market signals. For example, market signals that indicate a decrease in supply or an increase in demand can be used by the pricing module 304 to increase the current reservation price. Similarly, market signals that indicate an increase in supply or a decrease in demand can be used by the pricing module 304 to decrease the current reservation price.

In some implementations, the pricing module 304 can obtain market signals, for example, from data stored in the feedback module 308. In these implementations, the feedback module 308 can access market information directly from the reservation store 302, or through the inventory module 306, or by usage data received from the advertising management system 104. As discussed above, demand signals can be generated in response to an increase in demand for the placement or related placements. The underlying data related to these demand signals, e.g., reservation rate purchases, etc., can be generated and stored in the reservation store 302, for example, by the advertisement management system 104. The feedback module 308 can identify the demand signals from the data in the reservation store 302 and provide corresponding feedback to the pricing module 304. In turn, the pricing module 304 can adjust the price in response to receiving the demand signals.

Market signals may not be directly available from data stored in the reservation store 302. In these situations, the feedback module 308 can receive data based market signals, for example, from the inventory module 306. The inventory module 306 can be operable, for example, to determine a percentage of available placement inventory relative to all placement inventory. The determination can be made, for example, based on the number of related placements that are reserved prior to the auction time. The inventory module 306 can use this determination to provide a market signal to the feedback module 308. The feedback module 308 can provide the market signal to the pricing module 304 and the pricing module 304 can adjust the current reservation price accordingly.

Once the reservation price has been determined, the pricing module 304 can provide the current reservation price to the advertisement management system 104 to determine whether a bid satisfies the current reservation price. In some implementations, an advertiser can submit a bid for the reservation without being provided the reservation price. In other implementations, the advertiser can be provided the current reservation price and determine whether to reserve the presentation.

If an advertiser submits a bid that satisfies the current reservation price, the advertisement management system 104 can provide the reservation information directly to the inventory module 306 or to the reservation store 302. In turn, the inventory module 306 can reserve the placement for the bidder, remove the placement from the list of available placement inventory, and provide an updated market signal based on the updated list of available placements to the feedback module 308. The feedback module 308 can maintain the updated market signal and provide the market signal to the pricing module 304 to facilitate determination of reservation prices for related placements.

§5.0 Example Process Flow

Figure 4:
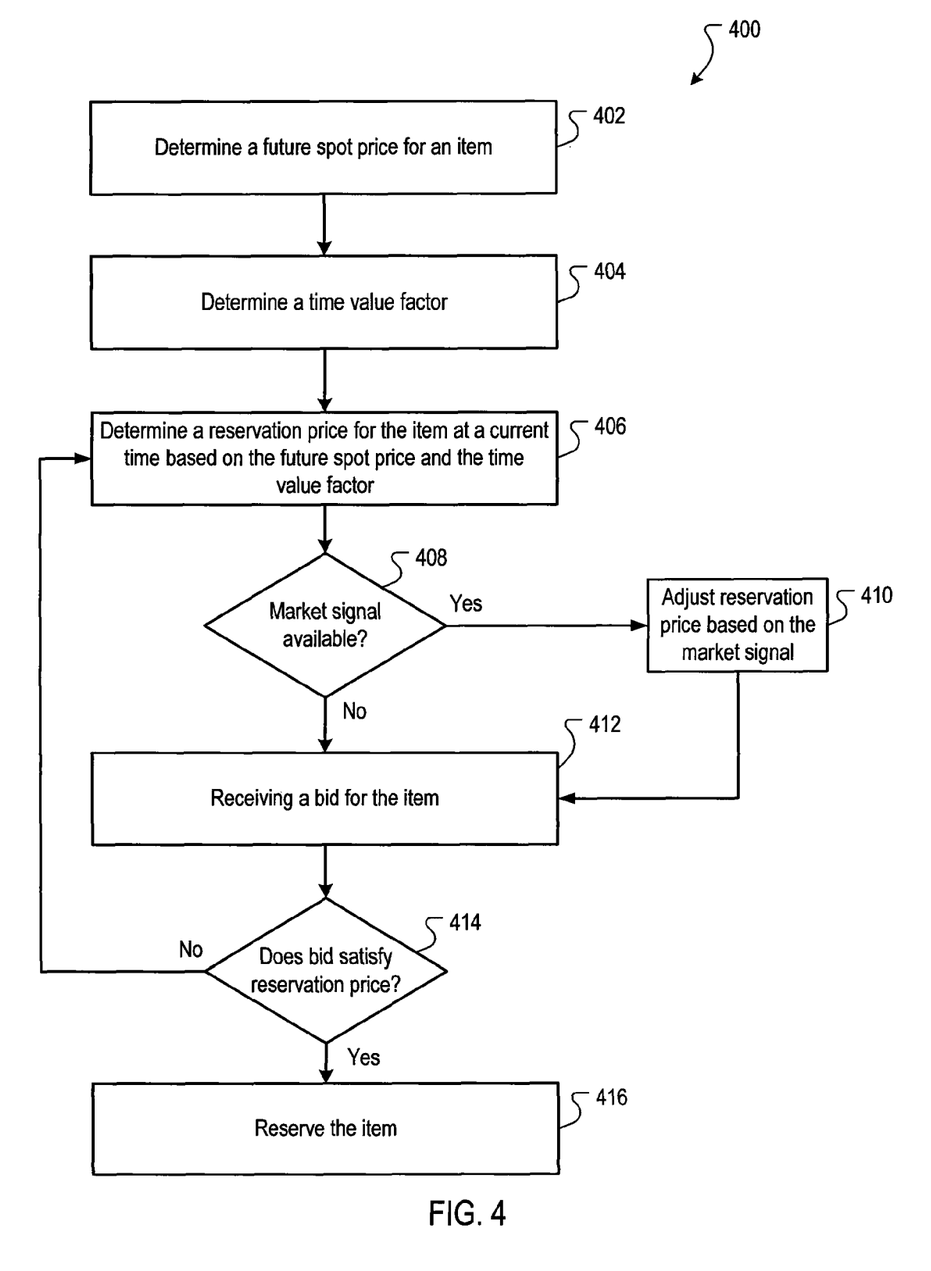
FIG. 4 is a flow chart of an example reservation pricing curve based on time and demand.

FIG. 4 is a flow chart of an example process 400 of reserving items. The process 400 can, for example, be used in the advertisement management system 104 and/or the reservation subsystem 130 of FIG. 1.

Stage 402 determines a future spot price for an item. In some implementations, the future spot price can be an estimated price that is required for settlement in a spot market at a future time. An example spot market is an online placement auction in which settlement of the auction and presentation of an advertisement in a placement occurs contemporaneously. The future spot price can be the expected future price required to win the online placement auction. The future spot price can be determined, for example, by the pricing module 304 of the reservation subsystem 130.

Stage 404 determines a time value factor. In some implementations, the time value factor can define a time dependent value of acquiring the item prior to the item being offered in the spot market at the future time. For example, the time value factor can define the value that an advertiser derives from reserving a placement in advance of an online auction for the placement. In some implementations, a time value function can be defined that facilitates determination of the time value factor. The time value factor and time value function can be determined, for example, by the advertisement management system 104 or the pricing subsystem of FIG. 1, and can be adjusted over time, e.g., adjusted to increase a reservation prices if too many reservations are being sold, or adjusted to decreases a reservation price if too few reservations are being sold.

Stage 406 determines a reservation price for the item at a current time based on the future spot price and the time value factor. In some implementations, the reservation price can converge to the future spot price as the current time approaches the future time. The reservation price can be determined, for example, by the pricing module 304 of the reservation subsystem 130.

Stage 408 determines if a market signal is available. In some implementations, the market signal can be a demand signal that represents the current demand for the item. The determination of whether a market signal is available can be performed, for example, by the feedback module 308 of the reservation subsystem 130.

When a market signal is available, stage 410 adjusts the reservation price based on the market signal. For example, the reservation price can be increased based on identification of a demand signal that indicates an increase in demand for the item or related items. The reservation price adjustment can be performed, for example, by the pricing module 304 of the reservation subsystem 130.

Stage 412 receives a bid for the item. In some implementations, the bid can be received from a bidder prior to or without presentation of the reservation price to the bidder. In these implementations, the bid can be received at any time. In some implementations, the bid can be received after the reservation price is presented to the bidder. The bid can be received, for example, by the advertisement management system 104.

Stage 414 determines if the bid satisfies the reservation price. In some implementations, the bid satisfies the reservation price when the bid meets or exceeds the reservation price. The determination of whether the bid satisfies the reservation price can be performed, for example, by the advertisement management system 104. When the bid does not satisfy the reservation price, the process 400 can continue to stage 406. When the bid satisfies the reservation price, the process 400 can continue to stage 416.

Stage 416 reserves the item. The item can be reserved for the bidder that submitted the bid that satisfies the reservation price. The item can be reserved, for example, by the inventory module 306 or the advertisement management system 104.

§6.0 Example Computer System

Figure 5:
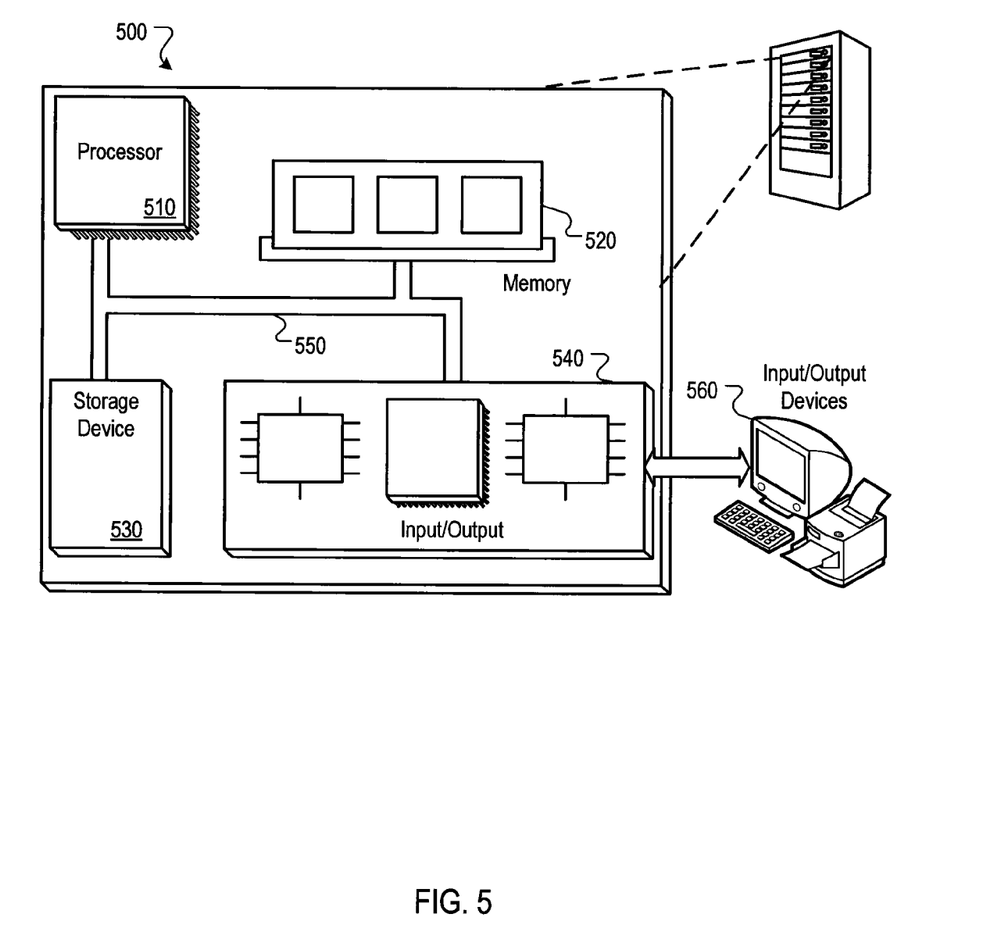
FIG. 5 is a block diagram of an example computer system.

FIG. 5 is block diagram of an example computer system 500. The system 500 can be used to implement the reservation subsystem 130, and includes a processor 510, a memory 520, a storage device 530, and an input/output device 540. Each of the components 510, 520, 530, and 540 can, for example, be interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can, for example, include a hard disk device, an optical disk device, or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
   receiving a bid from a user, the bid specifying a maximum amount that the user will pay to obtain an item prior to an auction of the item;
   determining, by a computer, a future spot price for an item, the future spot price being an estimated price at which the item will be awarded by the auction at a future time;
   determining, by a computer, a time value factor that defines a time dependent value of reserving the item prior to the item being auctioned at the future time;
   determining, by a computer, a reservation price for the item at a current time, the reservation price being determined based on the future spot price, the time value factor, and a difference between the current time and the future time at which the item will be auctioned, the reservation price being determined using a function that causes the reservation price to converge to the future spot price as the difference between the current time and the future time approaches zero;
   adjusting the reservation price based on market signals that specify a change in demand for the item, wherein adjusting the reservation price comprises increasing the reservation price based on a demand signal indicating that the demand for the item has increased since a time prior to the current time;
   determining that the bid meets the reservation price; and
   in response to determining that the bid meets the reservation price, awarding, by a computer, the item to the user at the reservation price.

2. The method of claim 1, further comprising determining a market signal based on observed market conditions specifying a reduction in a quantity of items that are available to be auctioned at the future time.

3. The method of claim 1, wherein adjusting the reservation price further comprises decreasing the reservation price as the difference between the current time and the future time approaches zero.

4. The method of claim 1, wherein determining the future spot price for the item comprises determining the future spot price for the item based on previous actual spot market prices for the item.

5. The method of claim 1, wherein the auction is an online auction in which advertisers are awarded advertisement placements in response to an advertisement request that requests advertisements to be presented with a web page.

6. The method of claim 5, wherein the item is an online advertisement placement that is reserved prior to the online auction.

7. The method of claim 1, wherein awarding the item further comprises removing the item from a list of available items that are available to be reserved prior to the auction.

8. A reservation system, comprising:
   a data store storing auction information and reservation information for placements, the auction information specifying outcomes of previous auctions for an item, the reservation information including a bid from a user, the bid specifying a maximum amount that the user will pay to obtain an item prior to an auction of the item;
   one or more computers configured to interact with the data store and further configured to perform operations including:
      receiving a bid from a user, the bid specifying a maximum amount that the user will pay to obtain an item prior to an auction of the item;
      determining a future spot price for an item, the future spot price being an estimated price at which the item will be awarded by the auction at a future time, the future spot price being determined based on the auction information;
      determining a time value factor that defines a time dependent value of reserving the item prior to the item being auctioned at the future time;
      determining a reservation price for the item at a current time, the reservation price being determined based on the future spot price, the time value factor, and a difference between the current time and the future time at which the item will be auctioned;

adjusting the reservation price as the difference between the current time and the future time approaches zero, the adjusted reservation price being determined by a function that causes the reservation price to converge to the future spot price as the difference between the current time and the future time approaches zero;

adjusting the reservation price based on market signals that specify a change in demand for the item, wherein adjusting the reservation price comprises increasing the reservation price based on a demand signal indicating that the demand for the item has increased since a time prior to the current time;

determining that the bid meets the reservation price; and in response to determining that the bid meets the reservation price, awarding the item to the user at the reservation price.

9. The system of claim 8, wherein the one or more computers are further operable to identify and maintain a list of available placement inventory and provide a market signal based on the available placement inventory.

10. The system of claim 9, wherein the one or more computers are further operable to remove the item from the list of available inventory when the item is reserved.

11. The system of claim 10, wherein the one or more computers are further operable to provide an updated market signal when the item is removed from the list of available inventory, the updated market signal specifying a reduction in a quantity of items that are available to be auctioned at the future time.

12. The system of claim 8, wherein the one or more computers are further operable to determine the expected future price based on historical auction price information.

13. The system of claim 8, wherein the auction is an online auction in which advertisers are awarded advertisement placements in response to an advertisement request that requests advertisements to be presented with a web page.

14. The system of claim 13, wherein the item is an online advertisement placement.

15. A device, comprising:

means for determining a future spot price for an item, the future spot price being an estimated price that is required for settlement in a spot market at a future time;

means for determining a time value factor that defines a time dependent value of acquiring the item prior to the item being offered in the spot market at the future time;

means for determining a reservation price for the item at a current time, the reservation price being determined based on the future spot price, a difference between the current time and the future time, and the time value factor, the reservation price converging to the future spot price as the difference between the current time and the future time approaches zero;

means for adjusting the reservation price based on market signals that specify a change in demand for the item, wherein adjusting the reservation price comprises increasing the reservation price based on a demand signal indicating that the demand for the item has increased since a time prior to the current time;

means for determining that the bid meets the reservation price; and means for awarding the item to the user at the reservation price, in response to determining that the bid meets the reservation price.

* * * * *

UNITED STATES PATENT AND TRADEMARK OFFICE
CERTIFICATE OF CORRECTION

PATENT NO. : 8,301,491 B2  
APPLICATION NO. : 12/144497  
DATED : October 30, 2012  
INVENTOR(S) : Abhishek Bapna, Jonathan E. Feldman and Shanmugavelayutham Muthukrishnan Page 1 of 1

It is certified that error appears in the above-identified patent and that said Letters Patent is hereby corrected as shown below:

Title Page, Item (56), Column 2, Line 7 (Other Publications) – delete "Emirical" and insert -- Empirical --, therefore.

Signed and Sealed this  
Twelfth Day of February, 2013

Teresa Stanek Rea  
*Acting Director of the United States Patent and Trademark Office*

UNITED STATES PATENT AND TRADEMARK OFFICE
CERTIFICATE OF CORRECTION

| | |
|---|---|
| PATENT NO. | : 8,301,491 B2 |
| APPLICATION NO. | : 12/144497 |
| DATED | : October 30, 2012 |
| INVENTOR(S) | : Abhishek Bapna et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 788 days.

Signed and Sealed this
Second Day of April, 2013

Teresa Stanek Rea
*Acting Director of the United States Patent and Trademark Office*